United States Patent [19]

Werle et al.

[11] Patent Number: 4,501,840

[45] Date of Patent: Feb. 26, 1985

[54] ALKALINE MODIFIED PENTAERYTHRITOL STABILIZER FOR VINYL CHLORIDE RESIN

[75] Inventors: Peter Werle, Gelnhausen; Wolfgang Merk, Hanau, both of Fed. Rep. of Germany

[73] Assignee: Degussa Aktiengesellschaft, Frankfurt am Main, Fed. Rep. of Germany

[21] Appl. No.: 543,965

[22] Filed: Oct. 20, 1983

[30] Foreign Application Priority Data

Oct. 22, 1982 [DE] Fed. Rep. of Germany ....... 3239086

[51] Int. Cl.³ .............................................. C08L 27/06
[52] U.S. Cl. .................................... 524/387; 252/182; 524/377; 524/399; 524/400; 568/679; 568/680; 568/853
[58] Field of Search ...................... 568/679, 680, 853; 524/387, 399, 400, 377; 252/182

[56] References Cited

U.S. PATENT DOCUMENTS

| | | | |
|---|---|---|---|
| 2,564,646 | 8/1951 | Liestner | 524/147 |
| 3,004,000 | 10/1961 | Kauder | 523/100 |
| 3,142,659 | 7/1964 | Buckley | 524/387 |

FOREIGN PATENT DOCUMENTS

2356625  5/1974  Fed. Rep. of Germany .

OTHER PUBLICATIONS

Berlow et al., *The Pentaerythritols,* Reinhold, NY, 1958, p. 50.

*Primary Examiner*—Maurice J. Welsh
*Attorney, Agent, or Firm*—Cushman, Darby & Cushman

[57] ABSTRACT

Pentaerythritol is treated at a temperature of about 180° to 220° C. with a strongly alkaline acting material, e.g. calcium oxide. The thus treated pentaerythritol serves as a costabilizer e.g., with the salt of a polyvalent metal and a carboxylic acid, for a vinyl chloride resin, e.g. polyvinyl chloride and has outstanding properties as such.

25 Claims, No Drawings

ALKALINE MODIFIED PENTAERYTHRITOL STABILIZER FOR VINYL CHLORIDE RESIN

BACKGROUND OF THE INVENTION

The invention is directed to a process for the production of a co-stabilizer from pentaerythritol for the stabilization of vinyl chloride resins, especially polyvinyl chloride.

Polyvinyl chloride (and other vinyl chloride resins) are discolored by the action of light and especially at elevated temperatures, such as occurs in the shaping and process of polyvinyl chloride (and other vinyl chloride resins). To reduce or avoid this effect there are added stabilizers to the polyvinyl chloride (or other vinyl chloride resins). In many cases it is necessary to use co-stabilizers in order to increase and supplement the effect of the stabilizers.

It is known to add as a stabilizer for polyvinyl chloride (and other vinyl chloride resins) metal salts or their mixtures, among others the calcium, strontium, barium, zinc, cadmium, or lead salts of fatty acids and as a costabilizer to use organic phosphites, see Leistner U.S. Pat. No. 2,564,646, the entire disclosure of which is hereby incorporated by reference and relied upon. It is also known to employ as stabilizers mixtures of calcium or zinc benzoate together with mixtures of the calcium or zinc salts of the fatty acid mixtures present in natural fats and oils and to add sorbitol as a costabilizer, Kauder U.S. Pat. No. 3,004,000, the entire disclosure of which is hereby incorporated by reference and relied upon.

As stabilizers there are also employed iron compounds such as iron sulfate and as costabilizer polyhydric alcohols such as pentaerythritol, trimethylolpropane, dipentaerythritol and tripentaerythritol, Buckley U.S. Pat. No. 3,142,659, the entire disclosure of which is hereby incorporated by reference and relied upon. The disadvantage is, particularly with using polyhydric alcohols as costabilizers, that they cannot be homogeneously worked into vinyl chloride resins, e.g. polyvinyl chloride, or at best can only be worked in with considerable difficulty.

Besides it is known to use as stabilizers metal salts, namely calcium or zinc stearate or their mixture and as costabilizer to add a mixture of pentaerythritol and trimethylolpropane and in a given case, other polyhydric alcohols such as dipentaerythritol, tripentaerythritol, neopentyl glycol, trimethylolethane, mannitol, sorbitol or glycerine which are obtained by melting together the pentaerythritol with these materials and pulverizing the solidified melt (German OS No. 2,356,625, the entire disclosure of which is hereby incorporated by reference and relied upon). The thus prepared costabilizer indeed can be homogeneously worked into the polyvinyl chloride but must be used in a relatively large amount for the production of sufficient activity.

SUMMARY OF THE INVENTION

There has now been found a process for the production of a costabilizer made from pentaerythritol for the stabilization of polyvinyl chloride and other vinyl chloride resins characterized by treating the pentaerythritol at a temperature from about 180° to 220° C. with a strongly alkaline acting material. The thus treated pentaerythritol not only can be homogeneously worked into polyvinyl chloride and other vinyl chloride resins without difficulty but it has such a favorable effect that the use of a relatively small amount of this costabilizer is sufficient.

The pentaerythritol treated according to the inventions is suitable as a costabilizer in admixture with customary stabilizers, for example, salts of polyvalent metals and fatty acids. Especially suitable is the use as costabilizers with those stabilizers which are not toxic and therefore employed in polyvinyl chloride and other vinyl chloride resins which are used in packing of foodstuffs. These stabilizers are chiefly the magnesium, calcium and zinc salts of unbranched aliphatic monocarboxylic acids having 10 to 24 carbon atoms, e.g. fatty acids or their mixture. Illustrative of such salts include magnesium stearate, calcium stearate, zinc stearate, calcium decanoate, magnesium decanoate, zinc decanoate, calcium eicosanate, calcium laurate, zinc laurate, magnesium laurate, calcium oleate, zinc oleate, calcium ricinoleate, calcium palmitate. Other salts which can be used for example are calcium 2-ethylhexanoate, calcium neodecanoate, magnesium palmitate, magnesium neodecanoate, magnesium 2-ethylhexanoate, zinc neodecanoate, barium, and cadmium salts of fatty acids, e.g. barium stearate, cadmium stearate, cadmium oleate, cadmium neodecanoate, barium oleate, barium 2-ethylhexanoate, etc. Thus there can be employed as stabilizer the stabilizers of Leistner, Kauder, or Buckley.

Illustrative examples of vinyl chloride resins, include polyvinyl chloride, vinyl chloridevinyl acetate copolymer, vinyl chloride-vinylidene chloride copolymer, vinyl chloride-vinyl acetatemaleic anhydride terpolymer, vinyl chloride-acrylonitrile copolymer, vinyl chloride-styrene copolymer.

The amount of costabilizer added to the vinyl chloride resin, e.g. polyvinyl chloride, depends in a given case on the type and amount of stabilizer and according to the desired degree of stabilization. Suitably, the vinyl chloride resin, e.g. polyvinyl chloride, generally contains about 0.1 to 2.0 weight percent of the costabilizer. The amount, however can be more, e.g. up to 5 weight percent or less, e.g. 0.05 weight percent. Likewise the amount of stabilizer, e.g. polyvalent metal salt of a fatty acid, can vary widely, e.g. it can be employed in an amount of 0.1 to 10 weight percent.

According to the invention pentaerythritol is treated with strongly alkaline acting materials. Advantageously there is used pentaerythritol which contains about 5 to 20 weight percent of dipentaerythritol. As alkaline acting material there are suitably employed metal oxides or metal hydroxides, preferably the oxide or hydroxide of an alkaline earth metal, especially calcium oxide. Other suitable alkaline materials include calcium hydroxide, barium hydroxide, barium oxide, barium hydroxide, sodium oxide, sodium hydroxide, potassium oxide, potassium hydroxide, strontium oxide.

The amount of alkaline acting material used depends in a given case on the type of material. With advantage, especially in the case of calcium oxide there is employed 0.2 to 2.0 parts by weight, especially 0.3 to 1.0 parts by weight of alkaline acting material per 100 parts by weight of pentaerythritol.

The treatment of the pentaerythritol with the alkaline acting materials is carried out suitably at a temperature of about 180° to 220° C., preferably at a temperature of 190° to 210° C. In the treatment water is split off. The duration of the treatment depends to a certain extent on the temperature of treatment. Suitably the treatment is carried out until per mole of pentaerythritol employed 0.5 to 2.0 moles of water, preferably 0.8 to 1.2 moles of water is driven off.

The thus treated pentaerythritol solidifies upon cooling. Reduced to a powder, preferably with a particle size below 0.1 mm, it is ready for use as a costabilizer for polyvinyl chloride or other vinyl chloride resins.

Unless otherwise indicated, all parts and percentages are by weight.

The compositions can comprise, consist essentially of, or consist of the stated materials. The process can comprise, consist essentially of, or consist of the steps set forth with the recited material.

DETAILED DESCRIPTION

EXAMPLES

A. Production of the Costabilizer

EXAMPLE 1

1 kg of commercial pentaerythritol which contained 12 weight percent of dipentaerythritol and had a melting point between 230° and 240° C. was mixed with 8 grams of calcium oxide. The mixture was heated to 190° C. and held at this temperature for 60 minutes; meanwhile it formed a melt and water split off. In all 80 grams of water were driven off. The thus treated pentaerythritol solidified upon cooling. It was ground so that up to 90% had a particle size below 0.1 mm. The product was colorless. It sintered at 140° C. and melted at 150° C.

EXAMPLE 2

The procedure was as in EXAMPLE 1 but the mixture was heated to 207° C. 215 grams of water were driven off. The product was nearly colorless. It sintered at 95° C. and melted at 110° C.

EXAMPLE 3

The procedure was as in EXAMPLE 1 but there were employed 15 grams of calcium oxide and the mixture was held at 198° C. for 60 minutes. There were driven off 150 grams of water. The product was colorless. It sintered at 120° C. and melted at 140° C.

EXAMPLE 4

The procedure was as in EXAMPLE 1 but instead of calcium oxide there were employed 15 grams of sodium hydroxide and the mixture was held for 40 minutes at 215° C. There were driven off 82 grams of water. The product was colorless. It sintered at 145° C. and melted at 155° C.

B. Use of the Costabilizer

There were used a commercial soft polyvinyl chloride of the type Solvic 271 GB (dry blend type) K-value 72. 70 parts by weight of this polyvinyl chloride were mixed with 30 parts by weight of dioctyl phthalate as well as with 1.0 parts by weight of calcium stearate and 0.5 part by weight of zinc stearate. There were produced 4 mixtures of this type.

Mixture 1 remained without a costabilizer.

Mixture 2 was treated with 0.5 part by weight of a costabilizer produced according to German OS No. 2,356,625 (Commercial product Polyol 400Z of the Perstorp Company.

Mixture 3 was like mixture 2 but was treated with 1.0 part by weight of the costabilizer.

Mixture 4 was treated with 0.5 parts by weight of the product produced in EXAMPLE A 1 above.

The four mixtures were processed in each case for 10 minutes at 170° C. to 175° C. on a two roll mill and then pressed at 130° to 140° C. and 200 bar to films having a thickness of 0.5 mm. The films were colorless. Pieces of these films for testing their heat resistance were held for 30 to 90 minutes at 180° C. The results were as set forth in the following table.

TABLE

| Time (min) | Mixture | | | |
|---|---|---|---|---|
| | 1 | 2 | 3 | 4 |
| 30 | yellow brown | yellow | pale yellow | pale yellow |
| 45 | black | yellow brown with dark edges | orange | yellow orange |
| 60 | black | orange brown with dark edges | yellow brown with dark edges | yellow brown |
| 75 | black | black | orange brown with dark edges | yellow brown with dark edges |
| 90 | black | black | almost black | yellow brown with dark edges |

The entire disclosure of German priority application No. P 32 239086.6 is hereby incorporated by reference.

What is claimed is:

1. A process for producing a costabilizer suitable for the stabilization of polyvinyl chloride comprising heating pentaerythritol at a temperature of about 180° to 220° C. with a strongly alkaline acting material.

2. A process according to claim 1 wherein the alkaline acting material is an alkali metal or alkaline earth metal oxide or hydroxide.

3. A process according to claim 1 wherein the pentaerythritol is treated with about 0.2 to 2.0 parts by weight of alkaline acting material per 100 parts by weight of pentaerythritol.

4. A process according to claim 3 wherein the alkaline acting material is calcium oxide.

5. A process according to claim 1 wherein the alkaline acting material is calcium oxide.

6. A process according to claim 5 wherein the pentaerythritol contains 5 to 20 weight percent of dipentaerythritol.

7. A process according to claim 4 wherein the pentaerythritol contains 5 to 20 weight percent of dipentaerythritol.

8. A process according to claim 3 wherein the pentaerythritol contains 5 to 20 weight percent of dipentaerythritol.

9. A process according to claim 1 wherein the pentaerythritol contains 5 to 20 weight percent of dipentaerythritol.

10. A vinyl chloride resin composition having improved resistance to heat containing a stabilizer mixture for said resin comprising a costabilizer prepared by heating pentaerythritol at a temperature of about 180° to 220° C. with a strongly alkaline acting material and a vinyl chloride resin stabilizer compatible therewith, the costabilizer being present in an amount sufficient to improve the stabilizing effect of the stabilizer.

11. A vinyl chloride resin composition according to claim 10 wherein the vinyl chloride resin is polyvinyl chloride.

12. A vinyl chloride resin composition according to claim 11 wherein the vinyl chloride resin stabilizer is a polyvalent metal salt of a higher fatty acid.

13. A vinyl chloride resin composition according to claim 10 wherein the vinyl chloride resin stabilizer is a polyvalent metal salt of a higher fatty acid.

14. A vinyl chloride resin composition according to claim 11 wherein the alkaline acting material is an alkali metal or alkaline earth metal oxide or hydroxide.

15. A vinyl chloride resin composition according to claim 14 wherein the vinyl chloride resin stabilizer is a polyvalent metal salt of a higher fatty acid.

16. A vinyl chloride resin composition according to claim 13 wherein the vinyl chloride resin stabilizer is a polyvalent metal salt of a higher fatty acid.

17. A vinyl chloride composition according to claim 10 wherein the alkaline acting material is an alkali metal or alkaline earth metal oxide or hydroxide.

18. A vinyl chloride composition according to claim 17 wherein the pentaerythritol is treated with about 0.2 to 2.0 parts by weight of alkaline acting material per 100 parts by weight of pentaerythritol.

19. A vinyl chloride resin composition according to claim 13 wherein the pentaerythritol is treated with about 0.2 to 2.0 parts by weight of alkaline acting material per 100 parts by weight of pentaerythritol.

20. A vinyl chloride resin composition according to claim 19 wherein the polyvalent metal salt is a magnesium, calcium, or zinc salt of an unbranched fatty acid having 10 to 24 carbon atoms.

21. A resin composition according to claim 10 wherein the alkaline acting material is an alkali metal or alkaline earth metal oxide or hydroxide.

22. A resin composition according to claim 21 wherein the alkaline acting material is calcium oxide.

23. A process according to claim 1 wherein the materials heated consist of the pentaerythritol and the strongly alkaline material.

24. A process according to claim 23 wherein the strongly alkaline material is an alkali metal or alkaline earth metal oxide or hydroxide.

25. A process according to claim 1 including the step of cooling the thus treated pentaerythritol until it solidifies.

* * * * *